United States Patent [19]
Jernigan et al.

[11] Patent Number: 5,095,835
[45] Date of Patent: Mar. 17, 1992

[54] METHOD AND APPARATUS FOR PATTERN DUPLICATION THROUGH IMAGE ACQUISITION UTILIZING MACHINE VISION PROGRAMS WITH A SEWING APPARATUS HAVING X-Y AXIS MOVEMENT

[75] Inventors: Thomas K. Jernigan, North Hollywood; David Brower, Tarzana, both of Calif.

[73] Assignee: TD Quilting Machinery, Burbank, Calif.

[21] Appl. No.: 580,827

[22] Filed: Sep. 11, 1990

[51] Int. Cl.$^5$ ............................................. D05B 21/00
[52] U.S. Cl. ............................. 112/262.3; 112/266.1; 112/121.12; 112/103; 112/119
[58] Field of Search ................. 112/121.12, 121.11, 112/103, 102, 445, 457, 119, 117, 118, 262.3, 266.1; 364/470

[56] References Cited
U.S. PATENT DOCUMENTS

| | | | |
|---|---|---|---|
| 4,526,116 | 7/1985 | Mannel | 112/103 X |
| 4,849,902 | 7/1989 | Yokoe et al. | 112/121.12 X |
| 4,953,485 | 9/1990 | Brower et al. | 112/121.12 X |
| 4,991,524 | 2/1991 | Ozaki | 112/121.12 |
| 4,998,489 | 3/1991 | Hisatake et al. | 112/121.12 X |
| 5,005,500 | 4/1991 | Kato et al. | 112/121.12 |

Primary Examiner—Peter Nerbun
Attorney, Agent, or Firm—Thomas I. Rozsa

[57] ABSTRACT

An automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction through a process controller. The precise location of a sewing machine needle and fabric is illuminated and a color video camera which is mounted on a cross beam holding a sewing machine head is also focused on this location. The color video camera is connected through a preprocessor and a frame grabber to a process controller. A pattern creation means is also connected to the preprocessor and through the frame grabber to the process controller. The process controller includes a Machine Vision - R program which takes the pattern created by the pattern creation means and converts it into a pixel. The pixel is then mapped on a grid to determine the locations where the pattern is to duplicated. The process controller can then cause the pattern to be subsequently repeated at any multiplicity of desired locations.

27 Claims, 3 Drawing Sheets

METHOD AND APPARATUS FOR PATTERN DUPLICATION THROUGH IMAGE ACQUISITION UTILIZING MACHINE VISION PROGRAMS WITH A SEWING APPARATUS HAVING X-Y AXIS MOVEMENT

BACKGROUND OF THE INVENTION

1. Field of the Invention

The field of the present invention relates to frame quilting machines which are large table-like structures used to sew patterns into large textile items; in particular bedspreads and quilts. The field of the present invention also relates to industrial sewing machine apparatus and processes used to sew patterns and stitching into large fabrics, which sewing operation is not easily performed on conventional sewing machines. The field of the present invention also relates to machines which include a method of duplicating a selected pattern over an entire bedspread or quilt utilizing specialized computer assisted drawing techniques.

2. Description of the Prior Art

Industrial sewing machine operations are known in the prior art. Patterns and stitching into fabrics is commonly performed on industrial sewing machines. The operator hand guides the fabric between the needle and the sewing machine table and the pattern is sewn into the fabric. This process is practical for small pieces of fabric and is commonly done on piece goods such as garments. When handling larger pieces of fabric such as a roll of fabric, a method known in the prior art is roll to roll sewing. The sewing machine head is located along an X-axis and the material is unwound from a roll and caused to move transverse to the sewing machine head such that the fabric moves along a Y-axis. The sewing machine sews a stitch into the large fabric as the head moving along the X-axis and the fabric moving along the Y-axis intersect each other. The fabric is then wound onto a second receiving roll.

When sewing a very large piece of fabric such as a bedspread or quilt, a frame quilting machine is used. The frame quilting machine comprises a large frame, usually made of metal, onto which the fabric to be sewn is spread. Commonly, the pattern is sewn by a sewing machine guided by a computer into which a predetermined pattern has been programmed. The fabric remains stationary on the frame and the sewing machine head moves along the fabric and stitches in the predetermined pattern.

The present inventors are innovators in the field of frame quilting machine technology. The present inventors, David Brower and Thomas K. Jernigan, have the following United States patents and pending patent applications:

1. U.S. Pat. No. 4,860,675 issued to David Brower and Thomas K. Jernigan on Aug. 29, 1989 for "Automatic Quilting Machine For Specialized Quilting Of Patterns Which Can Be Controlled By A Remote Joy Stick And Monitored On A Video Screen".

2. U.S. Pat. No. 4,876,976 issued to David Brower and Thomas K. Jernigan on Oct. 31, 1989 for "Automatic Quilting Machine For Specialized Quilting Of Patterns Which Can Be Controlled By A Remote Joystick And Monitored On A Video Screen Including Pattern Duplication Through A Reprogrammable Computer".

3. U.S. Pat. No. 4,953,485 issued to David Brower and Thomas K. Jernigan on Sept. 4, 1990 for "Automatic Quilting Machine For Specialized Quilting Of Patterns Which Can Be Created By Utilizing Computer Graphics In Conjunction With A Reprogrammable Computer".

4. U.S. Pat. No. 4,953,483 issued to David Brower and Thomas K. Jernigan on Sept. 4, 1990 for "Automatic Quilting Machine And Method For Specialized Quilting Of Patterns With Separate Computers To Control The Stitching And Table Movement Functions".

5. Patent application Ser. No. 07/398,091 filed on Aug. 24, 1989 for "Automatic Roll To Roll Quilting Machine For Specialized Quilting Of Patterns Which Can Be Controlled By A Remote Joystick And Monitored On A Video Screen Including Pattern Duplication Through A Reprogrammable Computer And Method".

There is a need to improve on the prior art inventions of the present inventors by combining the features of those inventions with a method of plotting patterns. None of the prior art devices contain the features of the present invention which is the acquisition of images to obtain desired data (such as a recognized pixel count) to initiate or control the manufacturing process (such as stitching).

SUMMARY OF THE PRESENT INVENTION

The present invention relates to a technique for enabling a machine to recognize the starting location of an operation such as stitching and repeating the process at numerous desired selected locations. The technique and system can be used with any sewing machine wherein the fabric into which a pattern is to be sewn is moved in the X-Y direction. One example of such a machine is an automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head. An image of the precise location of the sewing machine needle and fabric is created with a video camera and monitor to line up the X-Y points on a grid. The video camera is connected to a process controller such as a computer to feed the image or part of an image of the intersection of the sewing needle and fabric into the computer so that it can be read by an image reproduction computer program, such as a Machine Vision-R program, installed on the computer. Other sewing machines which are different in configuration and which are smaller than frame quilting machines are also used with the present invention and are within the spirit and scope of the present invention.

The present invention is utilized with a fabric where a multiplicity of identical preprinted patterns are already printed on the fabric and it is necessary to stitch the same pattern based on the outline of the preprinted pattern. In addition, the present invention also relates to a reprogrammable function integrated into the system wherein the operator first causes the preprinted pattern to be traced into the machine memory by conventional means such as a joy stick, a digitizer cursor board, computer aided design (CAD) techniques, etc. The tracing function is facilitated through use of a Machine Vision - R computerized system. At the end of this step, the traced, CAD drawn or digitalized pattern is stored into the memory of the computer. Once such type of storage may be a pixel digitalized image of the pattern or part of the pattern, which is then embodied in the Machine Vision - R program. The Machine Vision - R program then permits the patterns to be duplicated as often as desired after information concerning the dimension of the fabric and the desired locations for the repeated pattern are input into the computer program. At the end of this step, the computer will have generated and stored a digitalized map of the entire area to be quilted. In the third step of the process, the operator will command the start of the automated quilting generated process and the computer will cause the machine to go to the marked locations in the computer which are comparable to the marked locations on the bedspread or quilt and repeat the individualized pattern which was created by the operator. Use of a camera which picks up the physical location of the specific pattern being stitched and which relays this information to the computer in association with the Machine Vision - R program initiates the operation.

Further, the present invention can be used with any desired computer system, for example a system where one computer or process controller controls both the quilting table movement function and the sewing machine head, and also with a system wherein the sewing machine function is controlled by one computer usually located on the sewing machine head and the quilting table motion in the X-direction, Y-direction, and X-Y direction is controlled by a separate computer.

One type of machine with which the present invention can be used is a frame quilting machine. The following discussion concerning frame quilting machines is intended to be illustrative of one type of machine with which the present invention can be used and is not intended to limit the use of the present invention to only frame quilting machines. Any sewing machine system where there is X-Y movement of the machine can have the present invention incorporated into it. Using the example of a frame quilting machine, a bedspread, comforter, quilt, etc. is stretched securely on a metal frame. It is placed on an X-Y positioning table for movement controlled through a sewing machine. The sewing machine has been modified and mounted on a steel frame (two cross beams top and bottom) that can accommodate twelve feet by twelve feet six inches of stitching dimensions. Of course it can be made larger or smaller. The machine has been engineered and built to satisfy increased production needs of manufacturers who supply "custom, hand-guided, or outline quilted patterns". The key elements of the present invention utilized with a frame quilting machine are: (a) sewing and auxiliary functions; (b) X-Y movement of the table; (c) a reprogrammable computer into which the individualized preprogrammed pattern has been traced, created by computer aided design, or digitized with an E-Prom, stored in memory and used with the Machine Vision - R program. After the pattern has been converted into a pixel pattern and at least one point for each subsequent pattern duplication has been marked into the Machine Vision - R computer program, the individualized pattern can be duplicated in each desired location of the bedspread or quilt through activation of the reprogrammable computer.

It has been discovered, according to the present invention, that if a video camera connected to a computer is focused on the location of the sewing needle and bedspread or quilt location where the needle is stitching the thread into the bedspread or quilt, this image can further provide a location for the computer to select as desired point on the preprinted pattern which is going to be stitched.

It has also been discovered, according to the present invention, that if the system includes a reprogrammable computer into which the specific design is formed into a pixel pattern and programmed through a Machine Vision - R program as it is being generated by the operator, the individualized pattern can be subsequently restitched over and over at desired locations through activation of the stitch mode of the Machine Vision - R program into the reprogrammable computer, thereby eliminating the necessity of the operator having to continuously hand guide the pattern at each new location.

It is therefore an object of the present invention to provide an apparatus by which an operator can remain at a remote location from a large frame quilting machine and cause a precise hand selected pattern to be sewn into the large bedspread, comforter, quilt, or other fabric which is held on the metal frame or table of the frame quilting machine.

It is another object of the present invention to provide an apparatus which enables frame quilting for specialized hand selected patterns to be quickly and efficiently performed with a minimum amount of training time of the operator.

It is a further object of the present invention to provide an apparatus which can accommodate computerized pattern quilting of a predetermined computer generated pattern and also accommodate specialized hand selected patterns, or any combination thereof, in the same unit.

It is an additional object of the present invention to increase the rate of production of hand guided patterns sewn into large fabrics such as bedspreads or quilts.

It is an additional object of the present invention to provide a system for drawing the patterns by any desired method and transferring them to a Machine Vision - R program, which can convert them to images such as a pixel image, and automatically duplicating the individualized patterns through the specialized Machine Vision - R computer program to eliminate the necessity of hand guiding the individualized pattern at each new location where it is stitched into the bedspread or quilt. This invention can be utilized with any sewing machine apparatus where X-Y movement of the machine is one feature of the machine and the pattern is sewn into the fabric through movement of the fabric relative to the sewing needle, or vice-versa, on any type of machine, of which the frame quilting machine is one example.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
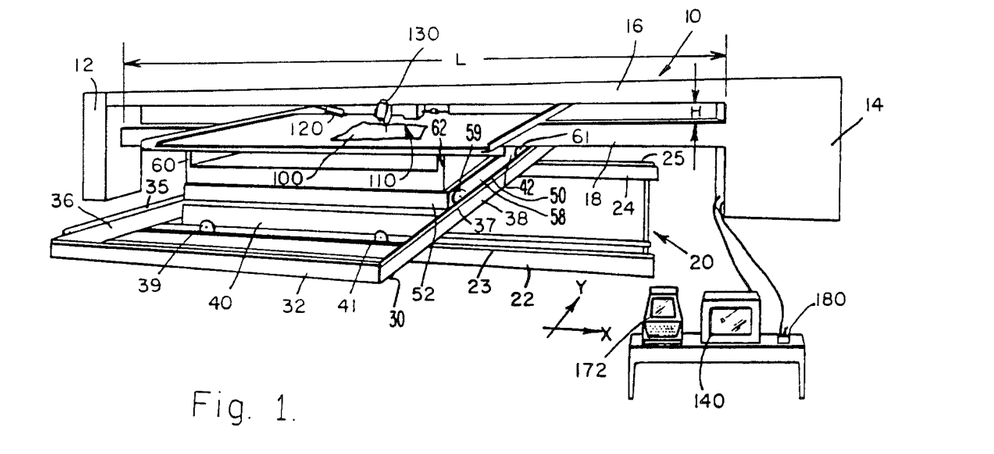
FIG. 1 is a perspective view of the present invention utilized with the example of a frame quilting machine, incorporating the feature of sewing or quilting specialized patterns including pattern duplication through a reprogrammable computer which comprises a Machine Vision - R computer program.

1. One Type Of Sewing Machine Apparatus With Which The Present Invention Can Be Used Using the frame quilting machine as an example, the main structural elements of the frame quilting machine will be discussed first. The entire frame quilting machine is designated as 10. The main structural member of the frame quilting machine 10 is a pair of posts or box members, comprising a left box member 12 and a right box member 14. By way of example, the left box member 12 which serves only as a support member can be made of quarter inch plate steel and can have a base which is twenty inches wide by twenty-four inches deep and fifty-two inches tall. The right box member 14 which includes the electronics and motors, as will be described later, in addition to acting as a support member, can also be made of quarter inch plate steel and can have a base which is forty-four inches wide by twenty-four inches deep and fifty-two inches tall. The two support boxes 12 and 14 support a pair of cross beams; an upper cross beam 16 and a lower cross beam 18. Upper cross beam 16 can be made of quarter inch plate steel and can be twenty-four feet long, four inches wide and eight inches tall. Lower cross beam 18 can be made of quarter inch plate steel and can be twenty-four feet long, eight inches wide and eight inches tall. As illustrated in FIG. 1, the two beams 16 and 18 run parallel to each other between support box members 12 and 14, and are separated by a gap "H" which by way of example may be nine and a half inches. The cross beams 16 and 18 are permanently attached to the supporting box members 12 and 14 by conventional means such as welding.

Figure 3:
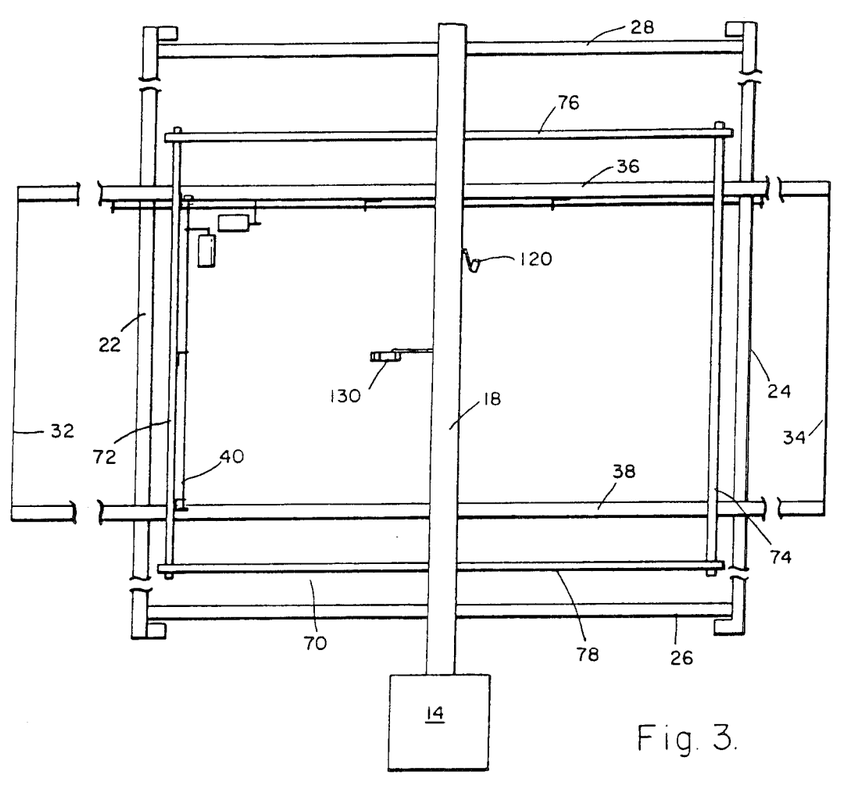
FIG. 3 is a top plan view of the main body of the frame invention automatic quilting machine including pattern duplication through a reprogrammable computer which comprises a Machine Vision - R computer program.

Referring to FIGS. 1 and 3, on the ground between the supporting box members 12 and 14 and beneath the lowermost cross beam 18 is the base track 20. The base track 20 is comprised of track supports 22 and 24 which support thereon a gear and rack system which will be described in greater later on. Track support 22 further comprises a track 23 on which a pair of rollers may roll. Track support 24 further comprises a track 25 on which a pair of rollers may roll. The track supports 22 and 24 are aligned parallel to each other and are attached by means of transverse spacing members 26 and 28 which also run parallel to each other, thereby forming a generally square base which rests on the ground. Resting immediately above the base track 20 is a first movable support member track 30. The first movable support member track 30 is comprised of a pair of parallel X-direction beams 32 and 34 and a pair of Y direction beams 36 and 38 which are connected together to form a generally rectangular frame. The frame comprised of members 32, 34, 36 and 38 of first movable support member 30 support transverse roller members 40 and 42. Transverse roller member 40 is supported between Y direction beams 36 and 38 and is generally parallel to X-direction beams 32 and 34 and is aligned directly over track support 22. Transverse roller member 40 further comprises a pair of rollers 39 and 41. Transverse roller member 42 is supported between Y-direction beams 36 and 38 and is generally parallel to X-direction beams 32 and 34 and is aligned directly over track support 24. Transverse roller member 42 further comprises a pair of rollers (not shown). First movable support track 30 can move in the X direction as the rollers on transverse roller members 40 and 42 can roll on the track 23 contained on track support 22 and on track 25 contained on track support 24 respectively. Y-direction beam 36 further comprises a track 35 and Y-direction beam 38 further comprises a track 37. Y-direction beams 36 and 38 further comprise gear and rack assemblies, as will be described later.

Resting immediately above the first movable support member track 30 is a second movable support member track 50. The second movable support member track 50 is comprised of a pair of parallel X-direction beams, one of which is shown at 52 and a pair of Y direction beams, one of which is shown at 58, which are connected together to form a generally rectangular frame. The Y-direction beams on the second movable support member track 50 each further comprise a pair of rollers which enable the second movable support track 50 to move in the Y-direction. Y-direction beam 58 comprises a pair of rollers 59 and 61 which move on track 37 and Y-direction beam 56 comprises a pair of rollers (not shown) which move on track 35.

Second movable track member 50 further comprises four posts at its corners, two of which, 60 and 62 are shown in FIG. 1. The four posts support quilt table 70 which is comprised of X-direction table beams 72 and 74 and Y-direction table beams 76 and 78, connected together by means such as welding. X-direction table beam 72 is supported on posts 60 and 62 and X direction table beam 74 is supported on the two opposite posts (not shown). Y-direction table beams 76 and 78 are supported on the two X-direction table beams 72 and 74 adjacent their respective ends, as shown in FIGS. 1 and 3. The two X-direction table beams 72 and 74 are parallel to each other and the two Y-direction table beams 76 and 78 are parallel to each other.

As illustrated in FIGS. 1 and 3, the posts on second movable track member 50 support the table beams such that the table beams 76 and 78 pass through gap H between cross beams 16 and 18 and table beams 72 and 74 can pass through the gap H if the Y direction movement is of sufficient length. In operation, a bedspread or quilt 100 is stretched across the table beams 72, 74, 76, and 78, which by way of example can form a table surface of approximately twelve feet in the X-direction by twelve feet in the Y-direction, such that the quilt 100 is supported at its edges by the four table beams 72, 74, 76 and 78 which result in a fully accessible quilt over its entire interior upper and lower surface. The table beams are caused to move in the X-direction by first movable support track 30 as the rollers on transverse roller members 40 and 42 move along tracks 23 and 25 respectively. The length "L" of gap "H" is preferably at least twice the length of the two X-direction table beams 72 and 74. In this way, the entire X-direction area of the quilt table 70 can be reached by the centermost position along the cross beams 16 and 18. The table beams are caused to move in the Y direction by second movable support member track 50 when the rollers on its Y-direction beams move along tracks 35 and 37. The length of tracks 35 and 37 is at least twice the length of the two Y-direction table beams 76 and 78. In this way, the entire Y-direction area of the quilt table 70 can be reached by the centermost position along the cross beams 16 and 18. Through this combination of X and Y movements, the entire area of the quilt table 70 and the quilt 100 spread thereon can be reached by the centermost position of cross beams 16 and 18. In the preferred starting position, the quilt table 70 is centered relative to the cross beams 16 and 18 and can move in any X-Y direction relative the centermost position of the cross beams.

Figure 4:
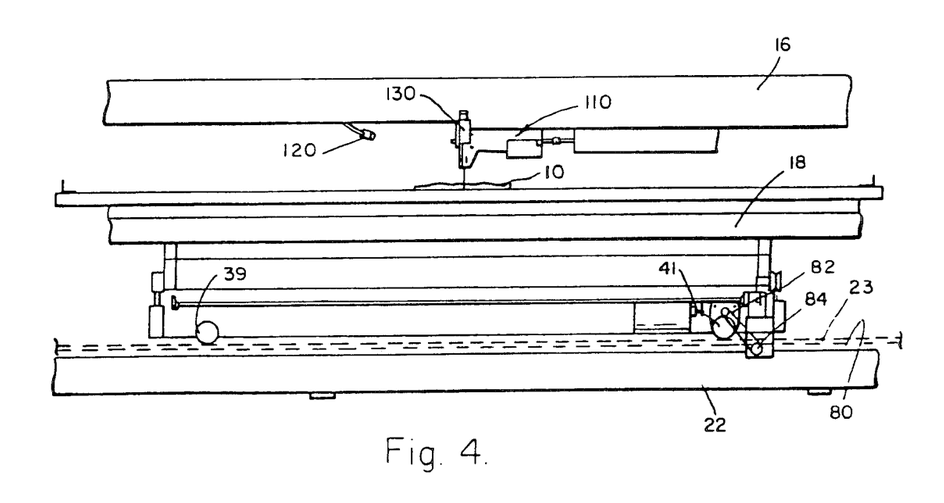
FIG. 4 is a front elevational view of the frame quilting machine including pattern duplication through a reprogrammable computer which comprises a Machine Vision - R computer program.

The quilt table 70 can be caused to move in the X and Y directions as previously described by numerous conventional types of means, such as a gear and rack assembly. One such gear and rack assembly is illustrated in FIG. 4. Track support 22 supports track 23 on which rollers 39 and 41 can roll in the X-direction. Track support 22 further contains on its interior surface a rack assembly 80 having a conventional multiplicity of teeth which can accommodate a gear. Transverse roller member 40 further supports a rotatable gear 82 which is caused to rotate by a conventional gear drive mechanism 84 having smaller gears driven by a belt to drive the rotatable gear 82. The gear drive mechanism is driven by a conventional linkage hookup to a drive motor which causes a motor shaft to rotate and thereby drive the gear drive mechanism 84 which in turn causes the rotatable gear 82 to rotate. When the rotatable gear rotates in the clockwise direction, the rotatable gear moves along the rack assembly 80 and causes the transverse roller member 40 (and opposite transverse roller member 42) to move to the right in the X-direction. When the rotatable gear rotates in the counterclockwise direction, the rotatable gear moves along the rack assembly 80 and causes the transverse roller member 40 (and opposite transverse roller member 42) to move to the left in the X-direction. It will be appreciated that a comparable rack and gear assembly is supported on Y-direction beam 38 and Y-direction beam 58, thereby enabling Y-direction beams 58 (and the opposite Y-direction beam on second movable support member track 50) to move back and forth in the Y-direction.

It will be appreciated that conventional adjustment modifications can be incorporated into this system. For example the overall height of the quilt table 70 can be adjusted up and down by creating slidable adjustments in the posts (60, 62 and to two opposite posts) in order to adjust the height of quilting table 70 relative to the cross beams 16 and 18.

Figure 5:
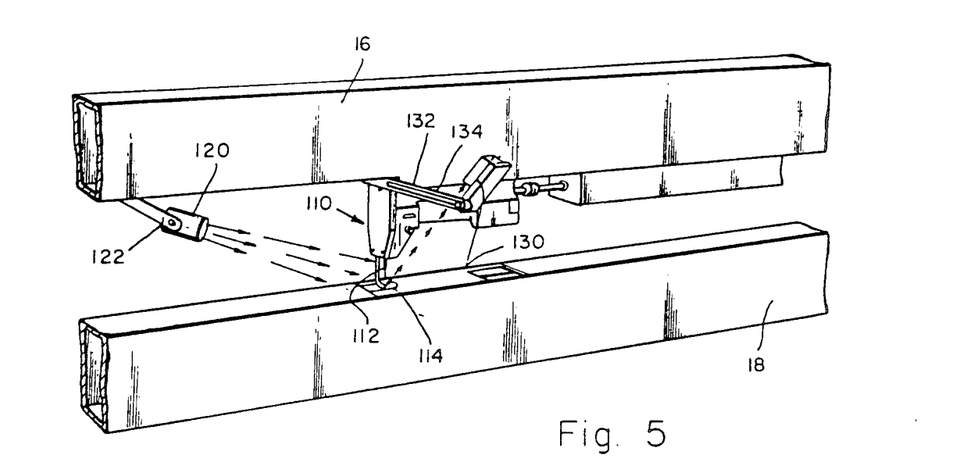
FIG. 5 is an enlarged perspective view of the front portion of the main support beam and attachments thereto of the frame quilting machine.
Figure 6:
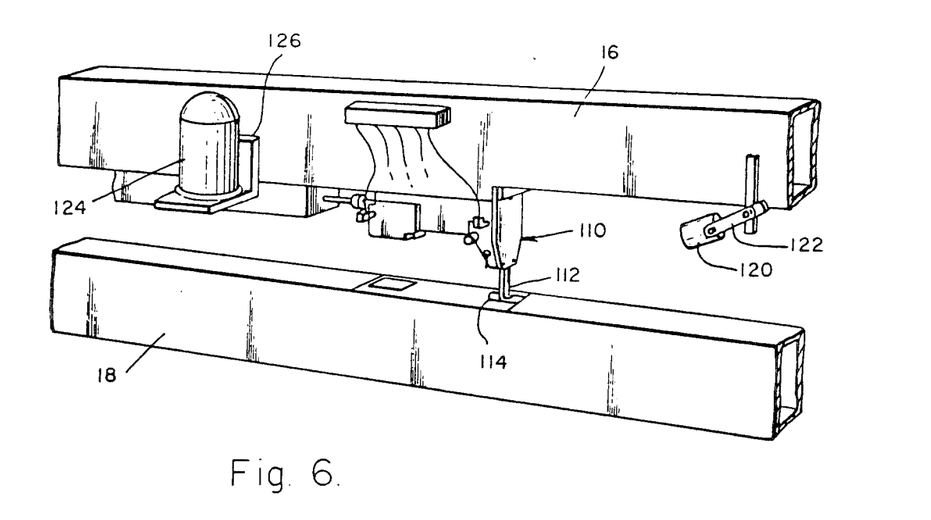
FIG. 6 is an enlarged perspective view of the rear portion of the main support beam and attachments thereto of the frame quilting machine.

Referring to FIGS. 4, 5, and 6, a sewing machine head 110 is bolted stationary to upper cross beam 16. Any industrial machine sewing head which is suitable for the intended sewing purpose can be incorporated with the present invention. In one alternative embodiment, the sewing machine head includes its own computer to control the stitching functions while a separate computer controls the frame quilting table movement functions. By way of example, one type of sewing machine head which can be used with the present invention is the Mitsubishi Industrial Sewing Machine Model LS2-180 high speed, single needle lockstitch sewing machine. A microprocessor connected to this type of sewing machine head provides many auxiliary functions such as control of needle position, presser foot lift, undertrim, and tension release disk. The sewing machine head 110 is attached to the underside of upper cross beam 16 such that the sewing needle 112 is at the approximate center of cross-beam 16. In this manner, the sewing needle 112 can reach any portion of the quilt table 70 and quilt 100 thereon by the X-Y movement of the quilt table, as previously discussed. The sewing machine plate 114 is formed into the top of lower cross beam 18 such that the plate 114 is aligned with the needle 112, as best illustrated in FIG. 6.

For purposes of the present invention, a source of light is not required and is an optional feature. If a source of light 120 is used, it is preferably attached to the upper cross beam 16 and directed such that the beam of light falls directly on the intersection area between the sewing needle 112 and the sewing machine plate 114. The source of light 120 may have an adjustment means 122 so that the direction of the beam can be altered, depending upon need. In this way, the area being stitched is brightly illuminated. A bobbin 124 is supported by a frame member 126 attached to one edge of upper cross beam 16. Thread 128 is wound on the bobbin 118 and is guided by conventional means through the sewing machine head 110 and to the needle 112.

A video camera 130 is mounted to an adjustable mounting bracket 132 which in turn is mounted to the upper cross beam 16. By way of example, adjustable mounting bracket 132 may contain an internal slide 134 and the video camera can be positioned along the slide at any desired location and rotated such that the focus of the video camera 130 is directly at the intersection of the sewing needle 112 and the sewing machine plate 114. In this way, since the area is illuminated by the source of light 120, a clear picture of the sewing machine needle 112 performing a sewing or stitching operation can be picked up by the video camera 130. The video camera 130 is a high quality full color resolution camera.

The video camera 130 is in turn connected to the process controller or computer so that the intersection image can be fed into the Machine Vision - R program and used to locate the portion of the preprinted pattern which will be stitched.

Figure 2:
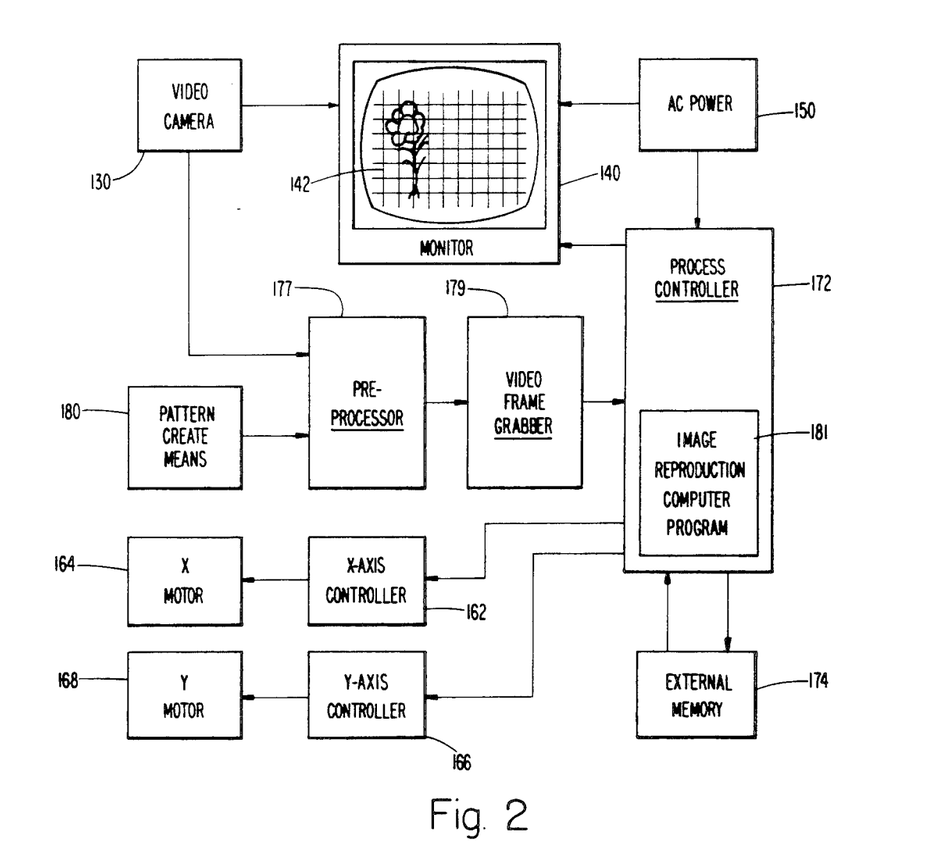
FIG. 2 is a block diagram of the components of the electronic control components of the present invention utilized with a sewing machine apparatus which has X-Y movement such as the frame quilting machine.

The quilting table 70 is automatically moved as the needle is sewing the pattern. Referring to FIG. 2, a source of alternating current power 150 energizes the entire system. The alternating current source 150 is connected to a process controller or computer 172 which provides control functions for movement of the quilting table beams in the X-direction, the Y-direction, and therefore the X-Y direction both for the initial pattern being traced and for subsequent duplication of the pattern as will be discussed hereafter. The process controller 172 is also connected to the sewing machine 110 and specifically to the separate computer within the sewing machine. The process controller 172 has an X-direction output which in turn is connected to an X-axis controller 162 which in turn is connected to the X direction motor 164 is which a direct current motor. The process controller 172 also has a Y-direction output which in turn is connected to a Y-axis controller 166 which in turn is connected to the Y direction motor 168 is Which a direct current motor. In the block diagram on FIG. 2, the process controller 172 is also shown connected to an external memory 174. It is also within the spirit and scope of the present invention for the process controller to have an internal memory. The electronic control components including the X-axis controller 162, the Y-axis controller 166, the X-direction motor 164, and the Y-direction motor 168 can all be housed in the larger supporting box member 14. It is also possible to house the process controller 172 and its external memory 174 within larger supporting box member 14.

2. Description Of The Present Invention

The present invention is defined as a method of reproducing a pattern in an apparatus used for sewing which includes X-Y axis movement of the fabric relative to the a sewing apparatus, comprising: (a) obtaining a video image of the location on the fabric of the outline of the pattern to be sewn and programming the X-Y coordinates of the pattern outline into a process controller; (b) designating a specific point on the programmed outline of the pattern as the starting point and programming this point as the starting point for duplicating the pattern; (c) utilizing a Machine Vision - R computer program in conjunction with the process controller to select the exact X-Y coordinate on the fabric for initiating the pattern duplication sewing process; and (d) causing the process controller to receive a video image of the general location of the pattern to be duplicated and causing the process controller through the Machine Vision computer program to precisely locate the exact point on the fabric to initiate the pattern duplication process and duplicating the pattern onto the fabric through the sewing apparatus.

The Machine Vision - R program selects the exact X-Y coordinate on the fabric by converting the programmed image of the pattern into a pixel pattern and selecting a pixel point as a reference point to begin the pattern duplication process.

The present invention is further defined as a method of reproducing a pattern at a multiplicity of locations on a fabric in an apparatus used for sewing which includes X-Y axis movement of the fabric relative to the a sewing apparatus, comprising: (a) obtaining a video image of each location on the fabric of the outline of the pattern to be sewn and programming the X-Y coordinates of the pattern outline at each location on the fabric into a process controller; (b) designating a specific point on the programmed outline of the pattern as the starting point and programming this point as the starting point for duplicating the pattern at each desired location; (c) utilizing a Machine Vision - R computer program in conjunction with the process controller to select the exact X-Y coordinates on the fabric for initiating the pattern duplication sewing process at each of the multiplicity of locations where the pattern is to be duplicated; and (d) causing the process controller to receive a video image of the general location of the pattern to be duplicated at each desired locating and causing the process controller through the Machine Vision computer program to precisely locate the exact point on the fabric to initiate the pattern duplication process and duplicating the pattern onto the fabric through the sewing apparatus at each of the multiplicity of locations where the pattern is to be duplicated.

The Machine Vision - R program selects the exact X-Y coordinates on the fabric by converting the programmed image of the pattern into a pixel pattern and selecting a pixel point as a reference point to begin the pattern duplication process, creating a grid to resemble the fabric size and selecting individualized points on the grid corresponding to the fabric where the pixel pattern is to be duplicated, and duplicating the pattern at each location.

The above described method is used in conjunction with type of X-Y axis sewing machine such as the frame quilting machine described above. The present invention is the use of the Machine Vision - R computer program in conjunction with a sewing machine having X-Y movement so that the selected pattern can be stitched, quilted, etc. at a multiplicity of desired locations. The process begins with a pattern creation means 180 which is used to program a specific pattern in the process controller 172. The pattern creation means can be a joystick for tracing the pattern, it can be a digitizer/cursor board used with an E-Prom, it can be a computer aided design package, or any other drawing technique for programming a selected pattern in the process controller 172. The video camera 130 is used to locate the position on the fabric 100 where the pattern, for example a flower, is to be stitched. The graphic design of the pattern of the flower is programmed into the process controller 172 through the pattern creation means 180, with the specific X-Y coordinates of the flower for the entire outline of the flower being programmed into the process controller 172 through the pattern creation means 180. The video camera 130 feeds the information of the X-Y coordinates visually into a monitor 140 so that the programmer can visually see the location of the X-Y coordinate on the fabric as it is being programmed to be certain that the programmed X-Y coordinate of the pattern exactly corresponds to the desired location on the outline of the flower.

A selected point on the pattern is also input so that the process controller, through use of the video camera viewing the location on the pattern, can cause the pattern to be restricted in its entirety at each printed pattern location by merely knowing the field of view around the location of the pattern.

After the entire outline of the desired pattern such as the flower has been programmed into the process controller 172, the operator creates a grid 142 corresponding to the fabric and programs into the process controller 172 the general location on the grid 142 where the desired pattern such as the flower appears. Therefore, assuming the flower is located at a multiplicity of locations on the grid, then the operator inputs into the process controller the general location on the grid where each of the multiplicity of the pattern is located. In operation, the process controller can then guide the machine to go to the general location where the outline of the pattern to be stitched is located by viewing the location on the fabric through the video camera which then feeds the location view to the process controller which therefore goes to the general location on the fabric where the outline pattern is located.

The improvement of the present invention is the inclusion of a Machine Vision - R program 181 used in conjunction with the process controller 172. After the outline of the pattern is programmed into the process controller 172, then a specific point on the outline is programmed into the process controller and this point is the starting point for the pattern. The program is then fed into the Machine Vision - R program and through the Machine Vision - R program, the process controller 172 now knows where the starting point for the pattern is located and can also duplicate the entire pattern which has been programmed into the process controller by knowing the starting point. Therefore, the process controller through obtaining the image of the fabric from the video camera goes to the general location of the pattern to be stitched based on the grid coordinates which have been programmed into the process controller and then the Machine Vision - R program takes over and finds the exact spot of the pattern to begin the sewing or stitching function and thereafter causes the machine such as the frame quilting machine 10 to cause the needle 112 to sew the desired pattern at the desired location into the fabric 100.

One way that the Machine Vision - R program can achieve this result will now be described. The Machine Vision - R program converts the image from the monitor into a pixel pattern. A pixel is the smallest part of a digitalized image. The pixel is a combination of light and dark squares. After the pattern is created by the pattern creation means 180, the image is transferred to the preprocessor 177 which converts the image into selected video frames which are sequentially grabbed by the video frame grabber 179 to which the preprocessor 177 is connected. The preprocessor 177 and the video frame grabber 179 may also be cards which are incorporated into the process controller 172. The video frame grabber 179 sequentially inputs the video frame images into the process controller 172 where the Machine Vision - R program 181 converts the image into a pixel pattern which appears on the monitor 140. The pixel pattern is a silhouette of the traced pattern which is created in a Binary Image of light and dark pixels or squares which squares are black, white and gray. The Machine Vision - R program incorporates within it the feature that if a single point of the pixel is selected, and that same point is marked on a grid pattern on the monitor, then the entire pixel can be duplicated with just the single reference point. After the specific programmed image is converted into a pixel count, the operator creates a grid to resemble the fabric size and selected individualized points on the grid corresponding to the fabric 100 where the programmed pattern is to be duplicated. The video camera 130 is then caused to focus on the general area of the fabric where a pixel pattern is to be duplicated and the Machine Vision - R program will then precisely locate the needle and fabric intersection point corresponding to the selected grid point and will duplicate the programmed pattern in the desired manner. As a result, a substantial amount of time in having to retrace each selected pattern at each desired location is saved by the automatic process of the pixel pattern duplication through the Machine Vision - R program. The focus of the camera at the general area of duplication is sufficient to cause the pattern to be precisely duplicated as desired. It is the Machine Vision - R program that initiates the pattern stitching, sewing,. etc.

The apparatus is designed with several modes which can be selected by an appropriate switch on the pattern creation means 180 or on the process controller 172. The first mode is the manual mode which is the manual operating mode of the machine wherein the operator has complete control of the X-Y motion functions of the machine and can trace each individual pattern as it is being sewn on the quilt, as described above. The apparatus also has the capability of duplicating the original hand designed pattern at any multiplicity of locations on the quilt or bedspread 100 through the Machine Vision - R program 181. The operator first selects the "Trace" mode and while using the pattern creation means, traces the pattern on the quilt 100. A monitor 140 may also be connected to the video camera 130 so that the operator can see the pattern being traced. As the pattern is being traced and sewn, the process controller is having the pattern encoded in the Machine Vision - R program 181, as previously described. As a result, the present invention provides the absolute maximum flexibility by including the capability of drawing any desired free hand shape through movement of the pattern creation means 180 while the operator views the movement on the monitor 140 which shows the intersection of the needle 112 and quilt 100 and subsequently cause the shape to be programmed into a process controller which can be easily duplicated. The final pattern can then be stored in the process controller's external memory 174 (or internal memory). Then, in a second step, a grid 142 of the quilt 100 can be formed on the monitor and selected locations on the quilt 100 can be mapped on the grid. Each location can be marked on the grid. At the end of this step, the process controller 172 will have generated and stored through the Machine Vision - R program 181 a map of the area to be quilted. In the third step, which is a "Duplicate" mode, the operator will command the start of the automated quilting generated process and the machine will then duplicate the selected pattern at each location which has been mapped. This third step can be executed independently of the first two steps as long as the selected memory bank has learned the stitch information. Therefore, once a combination hand selected and Machine Vision - R program pattern has been made and stored in memory, this pattern can be sewn on the quilt and then resewn on subsequent quilts, without the necessity of the operator having to hand trace the pattern over and over again. As will be appreciated, a library of standard stitch patterns can be embedded into the process controller to be called up by the operator at any future time.

The present invention can also be defined as a frame quilting machine comprising: (a) a frame member for retaining a fabric; (b) said frame member mounted on a structure which can be moved in the X-direction, the Y-direction, or any X-Y combination direction; (c) a first cross beam extending horizontally over said frame member; (d) a second cross beam aligned parallel to said first cross beam and extending horizontally beneath said frame member; (e) a first motor to generate movement of said frame member in the X-direction; (f) an X axis controller connected to said first motor; (g) a second motor to generate movement of said frame member in the Y-direction; (h) a Y axis controller connected to said second motor; (i) a process controller having an X input connected to said X axis controller to thereby control X axis movement of said frame member and also having a Y input connected to said Y axis controller to thereby control Y axis movement of said frame member; (j) a sewing machine head attached to said first cross beam and having a source of thread; (k) a sewing needle extending from said sewing machine head and positioned to sew threads into said fabric while the frame member and structure move underneath said first cross beam and above said second cross beam; (l) a sewing machine plate attached to said second cross beam and aligned with said sewing machine head and sewing needle; (m) a video camera movably secured to said first cross beam and focused on the intersection of said sewing machine needle and fabric, and connected to said process controller; (n) said process controller connected to said source of power; (o) a pattern creation means connected to said process controller; and (p) said process controller programmed with a Machine Vision - R program which converts the pattern created by said pattern creation means into a pixel and further converts the image transmitted from the video camera into a pixel; (q) whereby an operator may create a pattern through said pattern creation means and the pattern is programmed into the process controller where the Machine Vision - R program converts the pattern into a pixel and selection of a single point of the pattern on the pixel enables the entire pattern to be duplicated in the fabric by marking the single point of the pixel on a grid corresponding to the fabric and selecting the corresponding point on the grid where the pattern is to be duplicated, and transmission of the general area including the point on the fabric focused by the video camera is sufficient to have the pattern duplicated with initiation beginning at the marked point.

The process controller further comprises a memory to receive and store information of a pattern and can retain a memory of a selected map grid to duplicate the pixel at any desired mapped location on the fabric, whereby the pattern creation means can be combined with the Machine Vision - R Program and used to program a pattern to be sewn into the fabric, convert it into a pixel, and further map the pattern on a grid corresponding to the fabric, and the pixel and grid locations can be stored in the memory of the process controller to have the process controller subsequently cause the apparatus to sew the desired pattern at each mapped grid location on the fabric.

Defined more broadly, the present invention is an apparatus for sewing thread into fabric comprising: (a) a first structure supporting a sewing machine head having a sewing needle and a source of thread; (b) a second structure supporting the fabric in a position relative to said sewing needle so that thread may be sewn into the fabric; (c) said second structure capable of horizontal movement in the X-direction, the Y-direction, or any combination X-Y direction relative to said sewing needle; (d) means for generating the horizontal movement of said second structure in the X-direction, the Y-direction, or any combination X-Y direction; (e) a video camera focused on the location of the intersection of said sewing needle and said fabric; (f) said video camera connected to a preprocessor; (g) a process controller having an X input and a Y input connected to said means for generating horizontal movement of said second structure; (h) a source of power connected to said process controller; (i) said process controller connected to said source of power; (j) a pattern creation means connected to said process controller; and (k) said process controller programmed with a Machine Vision - R program which converts the pattern created by said pattern creation means into a pixel and further converts the image transmitted from the video camera into a pixel; (l) whereby an operator may create a pattern through said pattern creation means and the pattern is programmed into the process controller where the Machine Vision - R program converts the pattern into a pixel and selection of a single point of the pattern on the pixel enables the entire pattern to be duplicated in the fabric by marking the single point of the pixel on a grid corresponding to the fabric and selecting the corresponding point on the grid where the pattern is to be duplicated, and transmission of the general area including the point on the fabric focused by the video camera is sufficient to have the pattern duplicated with initiation beginning at the marked point.

As shown above, the present invention also encompasses the method of repetitively sewing a pattern into a fabric having a large surface comprising: (a) positioning a sewing machine head having a source of thread and a sewing needle relative to said fabric; (b) retaining said fabric on a movable structure which can be made to move in a horizontal direction relative to the sewing needle and which can cause a portion of the surface of the fabric to be reached by the sewing needle so that thread can be sewn into the fabric; (c) obtaining an electronically generated video image of the intersection of the sewing needle and fabric; (d) controlling the movement of the movable structure relative to the sewing needle by a process controller; (e) generating a pattern to be sewn into said fabric through a pattern creation means and converting the created pattern into a pixel through a Machine Vision - R program in a process controller and storing the pixel in the memory of the a process controller; (f) mapping said completed pixel on a computer grid to select where the pattern is to duplicated on said fabric; and (g) causing the pattern to be duplicated at any given location on the fabric by transmitting the video image of the selected location to the process controller whereby the pixel causes the location to correspond to a location on the pixel pattern grid and thereby duplicates the pattern at the selected location obtained by the video image.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A method of utilizing an image reproduction computer program operable on a process controller of a sewing apparatus to reproduce a pattern, the image reproduction computer program being able to convert the image of the pattern into a pixel pattern and, upon selecting a single reference point of the pixel pattern, being able to duplicate the entire pixel pattern, the sewing apparatus being able to stitch repetitive patterns on a fabric having a large surface while the fabric is caused to move relative to the sewing apparatus, the method comprising, a. obtaining a video image of the location on the fabric of the outline of the pattern to be sewn and programming X-Y coordinates of the pattern outline into the process controller;

b. designating a specific point on the programmed outline of the pattern as the starting point and programming this point as the starting point for duplicating the pattern;

c. performing the image reproduction computer program in conjunction with the process controller to select the exact X-Y coordinate on the fabric for initiating the pattern duplication sewing process; and d. causing the process controller to receive a video image of the general location on the fabric at which the pattern is to be duplicated and causing the process controller through the image reproduction computer program to precisely locate the exact point on the fabric to initiate the pattern duplication process and duplicating the pattern onto the fabric through the sewing apparatus.

2. A method in accordance with claim 1 wherein the image reproduction computer program selects the exact X-Y coordinate on the fabric by converting the programmed image of the pattern into a pixel pattern and selecting a pixel pattern point as a reference point to begin the pattern duplication process.

3. A method of utilizing an image reproduction computer program operable on a process controller of a sewing apparatus to reproduce a pattern at a multiplicity of locations on a fabric having a large surface, the image reproduction computer program being able to convert the image of the pattern into a pixel pattern and, upon selecting a single reference point of the pixel pattern, being able to duplicate the entire pixel pattern, the sewing apparatus being able to stitch repetitive patterns on the fabric as the fabric is caused to move relative to the sewing apparatus in X-Y coordinates, the method comprising, a. obtaining a video image of each location on the fabric of the outline of the pattern to be sewn and programming X-Y coordinates of the pattern outline at each location on the fabric into the process controller;

b. designating a specific point on the programmed outline of the pattern as the starting point and programming this point as the starting point for duplicating the pattern at each desired location;

c. performing the image reproduction computer program in conjunction with the process controller to select the exact X-Y coordinates on the fabric for initiating the pattern duplication sewing process at each of the multiplicity of locations where the pattern is to be duplicated; and d. causing the process controller to receive a video image of the general location on the fabric at which the pattern is to be duplicated at each desired location and causing the process controller through the image reproduction computer program to precisely locate the exact point on the fabric to initiate the pattern duplication process and duplicating the pattern onto the fabric through the sewing apparatus at each of the multiplicity of locations where the pattern is to be duplicated.

4. A method in accordance with claim 3 wherein the image reproduction computer program selects the exact X-Y coordinates on the fabric by converting the programmed image of the pattern into a pixel pattern and selecting a pixel pattern point as a reference point to begin the pattern duplication process, creating a grid to resemble the fabric size and selecting individualized points on the grid corresponding to the fabric where the pixel pattern is to be duplicated, and duplicating the pixel pattern at each location.

5. A sewing apparatus utilizing an image reproduction computer program, the image reproduction computer program being able to convert the image of a pattern into a pixel pattern and, upon selecting a single reference point of the pixel pattern, being able to duplicate the entire pixel pattern, comprising:

a. a frame member for retaining a fabric;

b. said frame member mounted on a structure which can be moved in the X-direction, the Y-direction, or any X-Y combination direction;

c. a first cross beam extending horizontally over said frame member;

d. a second cross beam aligned parallel to said first cross beam and extending horizontally beneath said frame member;

e. a first motor to generate movement of said frame member in the X-direction;

f. an X axis controller connected to said first motor;

g. a second motor to generate movement of said frame member in the Y-direction;

h. a Y axis controller connected to said second motor;

i. a process controller having an X input connected to said X axis controller to thereby control X axis movement of said frame member and also having a Y input connected to said Y axis controller to thereby control Y axis movement of said frame member;

j. a sewing machine head attached to said first cross beam and having a source of thread;

k. a sewing needle extending from said sewing machine head and positioned to sew threads into said fabric while the frame member and structure move underneath said first cross beam and above said second cross beam;

l. a sewing machine plate attached to said second cross beam and aligned with said sewing machine head and sewing needle;

m. a video camera movable secured to said first cross beam and focused on the intersection of said sewing machine needle and fabric, and connected to said process controller;

n. said process controller connected to a source of power;

o. a pattern creation means connected to said process controller; and p. said process controller programmed with the image reproduction computer program which converts the pattern created by said pattern creation means into a pixel pattern and further converts the image transmitted from the video camera into a pixel pattern;

q. whereby an operator may create a pattern through said pattern creation means and the pattern is programmed into the process controller where the image reproduction computer program converts the pattern into a pixel pattern and selection of a single point of the pixel pattern enables the entire pixel pattern to be duplicated in the fabric by marking the single point of the pixel pattern on a grid corresponding to the fabric and selecting the corresponding point on the grid where the pixel pattern is to be duplicated, and transmission of the general area including the point on the fabric focused on by the video camera is sufficient to have the pattern duplicated with initiation beginning at the marked point.

6. An apparatus in accordance with claim 5 wherein said process controller further comprises a memory to receive and store information of a pattern and can retain a memory of a selected may grid to duplicate the pixel pattern at any desired mapped location on the fabric, whereby the pattern creation means can be operated with the image reproduction computer program and used to program a pattern to be sewn onto the fabric, convert it into a pixel pattern, and further map the pixel pattern on a grid corresponding to the fabric, and the pixel pattern and grid locations can be stored in the memory of the process controller to have the process controller subsequently cause the apparatus to sew the desired pattern at each mapped grid location on the fabric.

7. An apparatus in accordance with claim 5 wherein said fabric is a bedspread.

8. An apparatus in accordance with claim 5 wherein said fabric is a quilt.

9. An apparatus in accordance with claim 5 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

10. An apparatus utilizing an image reproduction computer program, the image reproduction computer program being able to convert the image of a pattern into a pixel pattern and, upon selecting a single reference point of the pixel pattern, being able to duplicate the entire pixel pattern, comprising:
   a. a first structure supporting a sewing machine head having a sewing needle and a source of thread;
   b. a second structure supporting a fabric in a position relative to said sewing needle so that thread may be sewn into the fabric;
   c. said second structure capable of horizontal movement in the X-direction, the Y-direction, or any combination X-Y direction relative to said sewing needle;
   d. means for generating the horizontal movement of said second structure in the X-direction, the Y-direction, or any combination X-Y direction;
   e. a video camera focused on the location of the intersection of said sewing needle and said fabric;
   f. said video camera connected to a preprocessor;
   g. a process controller having an X input and a Y input connected to said means for generating horizontal movement of said second structure;
   h. a source of power connected to said process controller;
   i. said preprocessor connected to said process controller;
   j. a pattern creation means connected to said preprocessor; and
   k. said process controller programmed with an image reproduction computer program which converts the pattern created by said pattern creation means into a pixel pattern and further converts the image transmitted from the video camera into a pixel pattern;
   l. whereby an operator may create a pattern through said pattern creation means and the pattern is programmed into the process controller where the image reproduction computer program converts the pattern into a pixel pattern and selection of a single point of the pixel pattern enables the entire pixel pattern to be duplicated in the fabric by marking the single point of the pixel pattern on a grid corresponding to the fabric and selecting the corresponding point on the grid where the pixel pattern is to be duplicated, and transmission of the general area including the point on the fabric focused on by the video camera is sufficient to have the pixel pattern duplicated with initiation beginning at the marked point.

11. An apparatus in accordance with claim 10 wherein said process controller further comprises a memory to receive and store information of a pattern and can retain a memory of a selected map grid to duplicate the pixel pattern at any desired mapped location on the fabric, whereby the pattern creation means can be operated with the image reproduction computer program and used to trace a pattern to be sewn onto the fabric, convert it into a pixel pattern, and further map the pixel pattern on a grid corresponding to the fabric, and the pixel pattern and grid locations can be stored in the memory of the process controller to have the process controller subsequently cause the apparatus to sew the desired pattern at each mapped grid location on said fabric.

12. An apparatus in accordance with claim 10 wherein said means for generating horizontal movement of the second structure further comprises:
   a. a first motor to generate movement of said frame member in the X-direction;
   b. an X axis controller connected to said first motor and also connected to an X input in said process controller;
   c. a second motor to generate movement of said frame member in the Y-direction; and
   d. a Y axis controller connected to said second motor and also connected to a Y input in said process controller.

13. An apparatus in accordance with claim 10 wherein said fabric is a bedspread.

14. An apparatus in accordance with claim 10 wherein said fabric is a quilt.

15. An apparatus in accordance with claim 10 wherein said first structure and said second structure are aligned such that said sewing needle is at the approximate center point of said fabric and said second structure can move relative to said first structure and said sewing needle so as to permit the sewing needle to reach any portion of the surface area of the fabric.

16. A method of utilizing an image reproduction computer program operable on a process controller of a sewing apparatus to reproduce a pattern, the image reproduction computer program being able to convert the image of the pattern into a pixel pattern and, upon selecting a single reference point of the pixel pattern, being able to duplicate the entire pixel pattern, the sewing apparatus being able to stitch repetitive patterns on a fabric having a large surface while the fabric is caused to move relative to the sewing apparatus, comprising:

a. positioning a sewing machine head having a source of thread and a sewing needle relative to said fabric;

b. retaining said fabric on a movable structure which can be made to move in a horizontal direction relative to the sewing needle and which can cause a portion of the surface of the fabric to be reached by the sewing needle so that thread can be sewn into the fabric;

c. obtaining an electronically generated video image of the intersection of the sewing needle and fabric;

d. controlling the movement of the movable structure relative to the sewing needle by the process controller;

e. generating a pattern to be sewn into said fabric through a pattern creation means and converting the created pattern into a pixel pattern through the image reproduction computer program on the process controller and storing the pixel pattern in the memory of the process controller;

f. mapping said completed pixel pattern on a grid to select where the pixel pattern is to be duplicated on said fabric; and g. causing the pixel pattern to be duplicated at any given location on the fabric by transmitting the video image of the selected location to the process controller to cause the location to correspond to a location on the grid and thereby duplicate the pixel pattern at the selected location obtained by the video image.

17. A sewing apparatus utilizing an image reproduction computer program, the image reproduction computer program being able to convert the image of a pattern into a pixel pattern and, upon selecting a single reference point of the pixel pattern, being able to duplicate the entire pixel pattern, comprising:

a. a frame member for retaining a fabric;

b. said frame member mounted on a structure which can be moved in the X-direction, the Y-direction, or any X-Y combination direction;

c. a first cross beam extending horizontally over said frame member;

d. a second cross beam aligned parallel to said first cross beam and extending horizontally beneath said frame member;

e. a first motor to generate movement of said frame member in the X-direction;

f. an X axis controller connected to said first motor;

g. a second motor to generate movement of said frame member in the Y-direction;

h. a Y axis controller connected to said second motor;

i. a process controller having an X input connected to said X axis controller to thereby control X axis movement of said frame member and also having a Y input connected to said Y axis controller to thereby control Y axis movement of said frame member;

j. a sewing machine head attached to said first cross beam and having a source of thread;

k. a sewing needle extending from said sewing machine head and positioned to sew threads into said fabric while the frame member and structure move underneath said first cross beam and above said second cross beam;

l. a sewing machine plate attached to said second cross beam and aligned with said sewing machine head and sewing needle;

m. said process controller connected to a source of power;

n. a pattern creation means connected to said process controller; and o. said process controller programmed with the image reproduction computer program which converts the pattern created by said pattern creation means into a pixel pattern;

p. whereby an operator may create a pattern through said pattern creation means and the pattern is programmed into the process controller where the image reproduction computer program converts the pattern into a pixel pattern and selection of a single point of the pixel pattern enables the entire pixel pattern to be duplicated in the fabric by marking the single point of the pixel pattern on a grid corresponding to the fabric and selecting the corresponding point on the grid where the pixel pattern is to be duplicated.

18. A apparatus in accordance with claim 17 wherein said process controller further comprises a memory to receive and store information of a pattern and can retain a memory of a selected map grid to duplicate the pixel pattern at any desired mapped location on the fabric, whereby the pattern creation means can be operated with the image reproduction computer program and used to program a pattern to be sewn onto the fabric, convert it into a pixel pattern, and further map the pixel pattern on a grid corresponding to the fabric, and the pixel pattern and grid locations can be stored in the memory of the process controller to have the process controller subsequently cause the apparatus to sew the desired pattern at each mapped grid location on the fabric.

19. An apparatus in accordance with claim 17 wherein said fabric is a bedspread.

20. An apparatus in accordance with claim 17 wherein said fabric is a quilt.

21. An apparatus in accordance with claim 17 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

22. An apparatus utilizing an image reproduction computer program, the image reproduction computer program being able to convert the image of a pattern into a pixel pattern and, upon selecting a single reference point of the pixel pattern, being able to duplicate the entire pixel pattern, comprising:

a. a first structure supporting a sewing machine head having a sewing needle and a source of thread;

b. a second structure supporting a fabric in a position relative to said sewing needle so that thread may be sewn into the fabric;

c. said second structure capable of horizontal movement in the X-direction, the Y-direction, or any combination X-Y direction relative to said sewing needle;

d. means for generating the horizontal movement of said second structure in the X-direction, the Y-direction or any combination X-Y direction;

e. a process controller having an X input and a Y input connected to said means for generating horizontal movement of said second structure;

f. a source of power connected to said process controller;

g. a pattern creation means connected to said process controller;

h. said process controller programmed with a image reproduction computer program which converts the pattern created by said pattern creation means into a pixel pattern; and i. said process controller further comprising a memory to receive and store information of a pattern and being able to retain a memory of a selected map grid to duplicate the pixel pattern at any desired mapped location on the fabric, such that the pattern creation means can be operated with the image reproduction computer program and used to trace a pattern to be sewn onto the fabric, convert it into a pixel pattern, and further map the pixel pattern on a grid corresponding to the fabric, and the pixel pattern and grid locations can be stored in the memory of the process controller to have the process controller subsequently cause the apparatus to sew the desired pattern at each mapped grid location on the fabric;

j. whereby an operator may create a pattern through said pattern creation means and the pattern is programmed into the process controller whereby the image reproduction computer program converts the pattern into a pixel pattern and selection of a single point of the pixel pattern enables the entire pixel pattern to be duplicated in the fabric by marking the single point of the pixel pattern on a grid corresponding to the fabric and selecting the corresponding point on the grid where the pixel pattern is to be duplicated.

23. An apparatus in accordance with claim 22 wherein said means for generating horizontal movement of the second structure further comprises:

a. a first motor to generate movement of said frame member in the X-direction;

b. an X axis controller connected to said first motor and also connected to an X input in said process controller;

c. a second motor to generate movement of said frame member in the Y-direction; and d. a Y axis controller connected to said second motor and also connected to a Y input in said process controller.

24. An apparatus in accordance with claim 22 wherein said fabric is a bedspread.

25. An apparatus in accordance with claim 22 wherein said fabric is a quilt.

26. An apparatus in accordance with claim 22 wherein said first structure and said second structure are aligned such that said sewing needle is at the approximate center point of said fabric and said second structure can move relative to said first structure and said sewing needle so as to permit the sewing needle to reach any portion of the surface area of the fabric.

27. A method of utilizing an image reproduction computer program operable on a process controller of a sewing apparatus to reproduce a pattern, the image reproduction computer program being able to convert the image of the pattern into a pixel pattern and, upon selecting a single reference point of the pixel pattern, being able to duplicate the entire pixel pattern, the sewing apparatus being able to stitch repetitive patterns on a fabric having a large surface, comprising:

a. positioning a sewing machine head having a source of thread and a sewing needle relative to said fabric;

b. retaining said fabric on a movable structure which can be made to move in a horizontal direction relative to the sewing needle and which can cause a portion of the surface of the fabric to be reached by the sewing needle so that thread can be sewn into the fabric;

c. controlling the movement of the movable structure relative to the sewing needle by the process controller;

d. generating a pattern to be sewn into said fabric through a pattern creation means and converting the created pattern into a pixel pattern through the image reproduction computer program on the process controller and storing the pixel pattern in the memory of the process controller;

e. mapping said completed pixel pattern on a grid to select where the pixel pattern is to be duplicated on said fabric; and f. causing the pixel pattern to be duplicated at any given location on the fabric by inputting information of a selected location to the process controller to cause the location to correspond to a location on the grid and thereby duplicate the pixel pattern at the selected location.

* * * * *